(12) United States Patent
Vissers

(10) Patent No.: US 7,712,351 B2
(45) Date of Patent: May 11, 2010

(54) DEVICE FOR THE TESTING OF PACKAGING MATERIAL

(76) Inventor: Everhard Vissers, Chemin Notre-Dame 30, 2013 Colombier (CH)

( * ) Notice: Subject to any disclaimer, the term of this patent is extended or adjusted under 35 U.S.C. 154(b) by 340 days.

(21) Appl. No.: 11/725,986

(22) Filed: Mar. 19, 2007

(65) Prior Publication Data

US 2007/0236240 A1     Oct. 11, 2007

Related U.S. Application Data

(63) Continuation-in-part of application No. PCT/EP2004/010485, filed on Sep. 17, 2004.

(51) Int. Cl.
*G01M 3/02* (2006.01)
(52) U.S. Cl. .............................. 73/41; 73/159
(58) Field of Classification Search ............... 73/40, 73/49.3, 41, 159, 41.2–41.4
See application file for complete search history.

(56) References Cited

U.S. PATENT DOCUMENTS

| | | | | |
|---|---|---|---|---|
| 3,811,317 A | * | 5/1974 | Leonard et al. ................. | 73/40 |
| 3,937,064 A | * | 2/1976 | Wolf et al. ...................... | 73/40 |
| 4,055,984 A | | 11/1977 | Marx et al. | |
| 5,327,775 A | | 7/1994 | Epshetsky et al. | |
| 5,524,478 A | * | 6/1996 | Joy et al. ......................... | 73/40 |
| 6,164,122 A | * | 12/2000 | Sisbarro et al. ................. | 73/45 |
| 6,318,154 B1 | * | 11/2001 | Povlacs et al. ................. | 73/40 |
| 7,383,720 B2 | * | 6/2008 | Buerkle et al. ................ | 73/40.7 |

FOREIGN PATENT DOCUMENTS

| | | |
|---|---|---|
| DE | 3842392 A1 | 6/1990 |
| GB | 1295303 A | 11/1972 |
| GB | 2145026 A | 3/1985 |
| GB | 2257796 A * | 1/1993 |

OTHER PUBLICATIONS

European Patent Office, International Search Report, Jun. 3, 2005, 3 pp., International Application No. PCT/EP2004/010485.

* cited by examiner

*Primary Examiner*—John Fitzgerald
(74) *Attorney, Agent, or Firm*—Joshua King; Graybeal Jackson LLP

(57) ABSTRACT

The present invention relates to a device 100 for the testing of a packaging material comprising a housing 101 with an opening 104, a holder 105, whereby the holder 105 is positioned in a inner chamber 106 with an in- and outlet and means 103 for applying a vacuum in the inner chamber 106. The vacuum means apply a vacuum on a material to be tested, which when having defects (like undesired pores) will not withstand the vacuum and generating to a signal.

17 Claims, 4 Drawing Sheets

DEVICE FOR THE TESTING OF PACKAGING MATERIAL

PRIORITY CLAIM

This is a continuation-in-part application which claims priority from PCT Application No. PCT/EP2004/010485, published in English, filed Sep. 17, 2004, which is incorporated by reference.

The present invention relates to a device which allows the non-destructive testing of packaging materials.

In many industrial areas, the tightness of packaging material is of utmost relevance. Problems due to leakage of packaging material arise in the production of foils, including multi-layer foils for the packaging of food etc. This is even more true for materials which have to be elastic, flexible and must provide a good tensile strength and tear resistance like latex gloves which are commonly used in hospitals. Further domains where materials with these properties are of considerable importance are, for example, hygienic products like condoms etc.

To date, it is difficult to test these materials either after manufacture and/or immediately prior to use with regard to their tensile strength and tear resistance. In the art, complicated test procedures and set ups have been used to date.

Therefore, the problem underlying the invention was to provide a new device for the testing of packaging materials immediately prior to use which is cheap, universally applicable and provides immediate and reliable results. A further problem to be solved was to facilitate the application of these materials to the object to be packaged.

This problem is solved by a device for the testing of packaging materials comprising an applicator with an opening, a holder which receives the material to be tested, whereby the holder is positioned adjacent to a inner chamber with an in- and outlet and means for applying a vacuum in the inner chamber.

The packaging material to be tested is positioned automatically or manually into the holder which positions the material tightly under or above the opening in a further inner chamber inside the device. The holder may be located inside the vacuum chamber or in an especially preferred embodiment on the outside of the chamber, more specifically on the outside of the housing. When correctly positioned and sealed at the inner part, e.g. on a ring and the like of the opening, the means for applying vacuum apply a vacuum inside the inner chamber, where the material is positioned. If the material has defects, like unwanted pores, is already partially torn or has perforations, the vacuum will decrease. The drop of the vacuum is monitored and detected by appropriate monitoring means which generate a corresponding signal which is detected by bare eyes or by electronic or mechanical means.

In an advantageous embodiment, the device further comprises sterilizing means for sterilizing the packaging material to be tested on the outside. The sterilizing means are for example small valves located inside the vacuum chamber and adjacent to the product to be tested. Sterilization may be carried out by spraying a sterilizing liquid through the valves. Usually, the tested material is sterilized automatically immediately prior to use during the application of the vacuum or after having packaged an object and immediately prior to or during retiring the object from the applicator.

Preferably, the device further comprises a stock section where the packaging material is kept before testing Thereby, also materials like Latex gloves, packaging foils etc. can be tested continuously on a large scale. A preferred stock section has the form of a spool where the product to be tested is rolled up, if necessary on a rollable support tape.

The means for applying a vacuum are in a preferred embodiment a vacuum pump. Vacuum pumps exist in different varieties and can be miniaturized if necessary thereby allowing a specific adaptation to the corresponding device for a specific material and the vacuum to be applied. A further advantage of the vacuum means, especially a vacuum pump, is that the product extends by the influence of the vacuum to an oversized form, e.g. latex gloves, condoms etc. so that the user only has to put the object to be packaged, for example his hands, in the oversized form of the gloves and to use it immediately after retiring his hands enveloped (packaged) by the gloves. In some preferred embodiments the device further comprises release means to help the end-user to retire the object(s) to be packaged. The oversized form of the packaging material has the further advantage, that complicated mechanisms for inserting/retiring of an object(s) to be packaged prior to use is avoided. Further preferred embodiments will miniaturize the device, which offers specific advantages in ready-to-use applications like in hospitals for latex gloves etc. It is understood that also defined portions of packaging foils can be tested in the same manner provided that the portion is fixed at the opening.

Preferably, the device comprises further means for transporting the material to be tested to the holder which offers the advantage that also batch materials like several thousands of latex gloves, condoms etc. can be tested in an economic way. In still a further embodiment, further means are present for e.g. transporting the defect products from the holder to a waste disposal.

The device according to the invention comprises in a further preferred embodiment monitoring and indication means which indicate if the product is defect if the vacuum drops or suitable for use if the vacuum applied is maintained.

The indication means are selected from the group consisting of a display, light emitting means and loud-speakers and offer a broad range depending on the needs of the user of each of how to detect faulty products. Monitoring means for monitoring a vacuum are essentially known in the art like sensors etc. and all of these means may be used within the present invention.

The device further comprises a computer unit, which stores data on defect products in a production batch and controls the operating of the device upon testing the products.

Preferably the material to be tested consists essentially of a foil or is a product made of a foil. The material of the foil may be of natural or synthetic origin, like latex, polypropylene, polyethylene, copolymers thereof, arabic gum etc.

In a further preferred embodiment, the foil comprises multiple layers. A large variation of different materials like multilayer garments, packaging foils, gloves for specific applications, condoms etc. can therefore inexpensively and reliably tested with the device according to the invention with regard to their sealing properties and tightness.

The invention is described in an exemplary manner by way of illustrative figures and examples which are not meant to be limiting.

Figure 1:
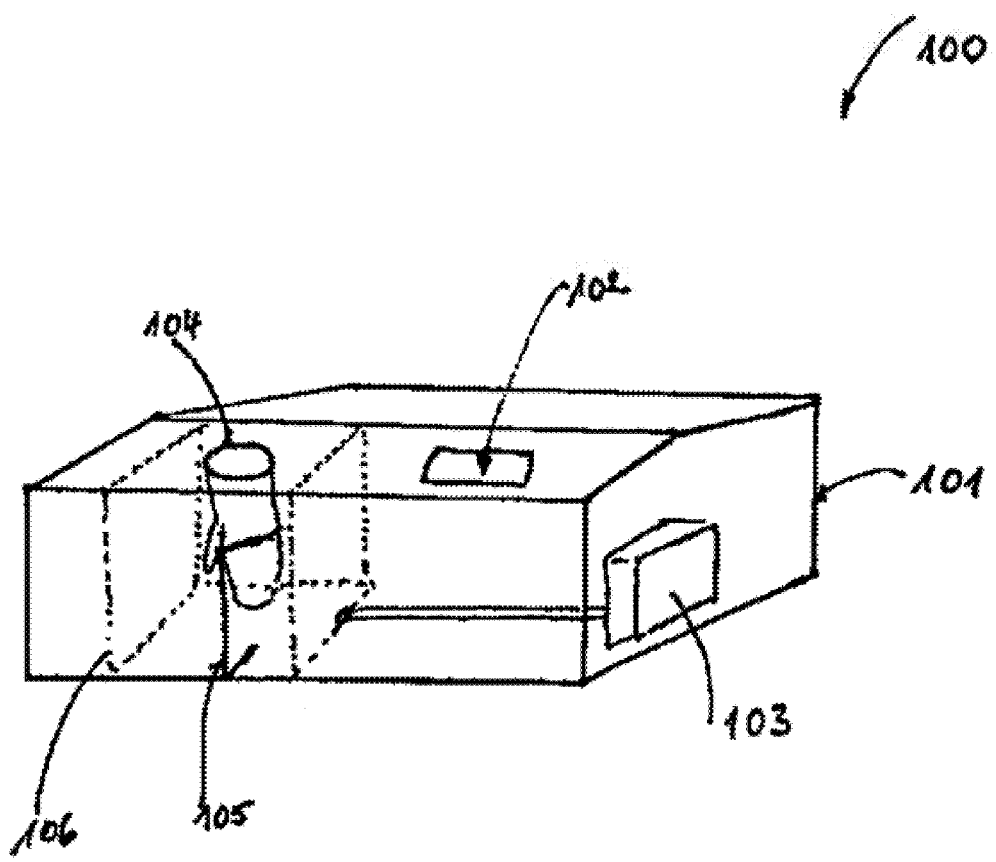
FIG. 1 shows a schematic view of a device according to the invention.

In FIG. 1, a device 100 according to the invention consists of a housing 101 made for example of a metal or metal alloy like steel, plastic material and the like. But any other suitable material which can withstand a vacuum and is resistant to mechanical stress and/or attack by aggressive chemical compounds, which may be used in a sterilizing or cleaning fluid can also be used within the scope of the invention. A display 102 is located at the front side of the housing 101. Instead of a display, other means for indicating faulty products and/or for controlling and/or operating the device may be used as well alone or in combination with one another. Monitoring means not shown in FIG. 1 like sensors etc. for monitoring the vacuum are also present and preferably connected to the indication means.

The indication means comprise but are not limited to loud speakers, optical means, a display etc. An opening 104 is also located at the front side of the housing 101. It is understood that the location of the opening 104 or the display 102 depends essentially on the specific requirements of a user and may be located on any other place at the housing where appropriate. In another embodiment, further openings, i.e. two or more are present. This is required when two or several materials have to be tested, then an appropriate number of openings 104 is present. The presence of two or even more openings is for example necessary, when gloves made for example of latex or polypropylene etc. are tested. In this instance it is often necessary to test two gloves at the same time, i.e. for the left and the right hand. In an especially preferred embodiment, the user can after testing immediately put the gloves onto his hands by simply inserting his hand(s) in the oversized gloves. This is also possible for other objects to be packaged. Inside the housing 101, an electric vacuum pump is 103 is located. In another embodiment, the vacuum pump is located outside the housing 101 and connected via tubes to the housing 101.

Inside the housing 101 or in another preferred embodiment outside the housing 101 a stock section is located for the products to be tested. Depending on the specific requirements, this stock section may comprise only several dozens or several thousands of products to be tested. From the stock section, transport means transport the product(s) to be tested to a holder 105 inside an inner chamber 106 with inlet valves and outlet valves. The holder 105 may in another embodiment also be located at the outside of the chamber for example on the housing around or above the openings (see for example FIG. 3). Further, means, for example valves, are located adjacent to the product to be tested which are connected with a tank containing a sterilizing liquid, like for example isopropanol, fungicides, spermicides in solution etc., which is sprayed onto the product.

The product is mounted in said holder 105 and sealed by natural adhesion tightly to the edge of the opening 104. The inner chamber is closed and a vacuum is applied to the inner chamber 106 by the vacuum pump 103. Under the influence of the vacuum, the product extends to an oversized form ready to use. If any perforations or defects of the product are present, the vacuum will decrease and the user is informed by monitoring and indication means thereof. The device automatically replaces the defect product(s) by another one which is subjected to the same test.

If the product is deemed suitable for use, for example has no perforations, the user is advised thereof by the indication means and can for example insert his hands or other objects like other body parts or other objects to be packaged in the openings and apply the product. The vacuum is brought to normal conditions and the packaged object can be released. It is understood that this procedure is also applicable to objects to be packaged in packaging foils. The user (manually) or the computer (electronically) activates release means not represented in FIG. 1 to release the tested material with the object firmly packaged therein.

Figure 2:
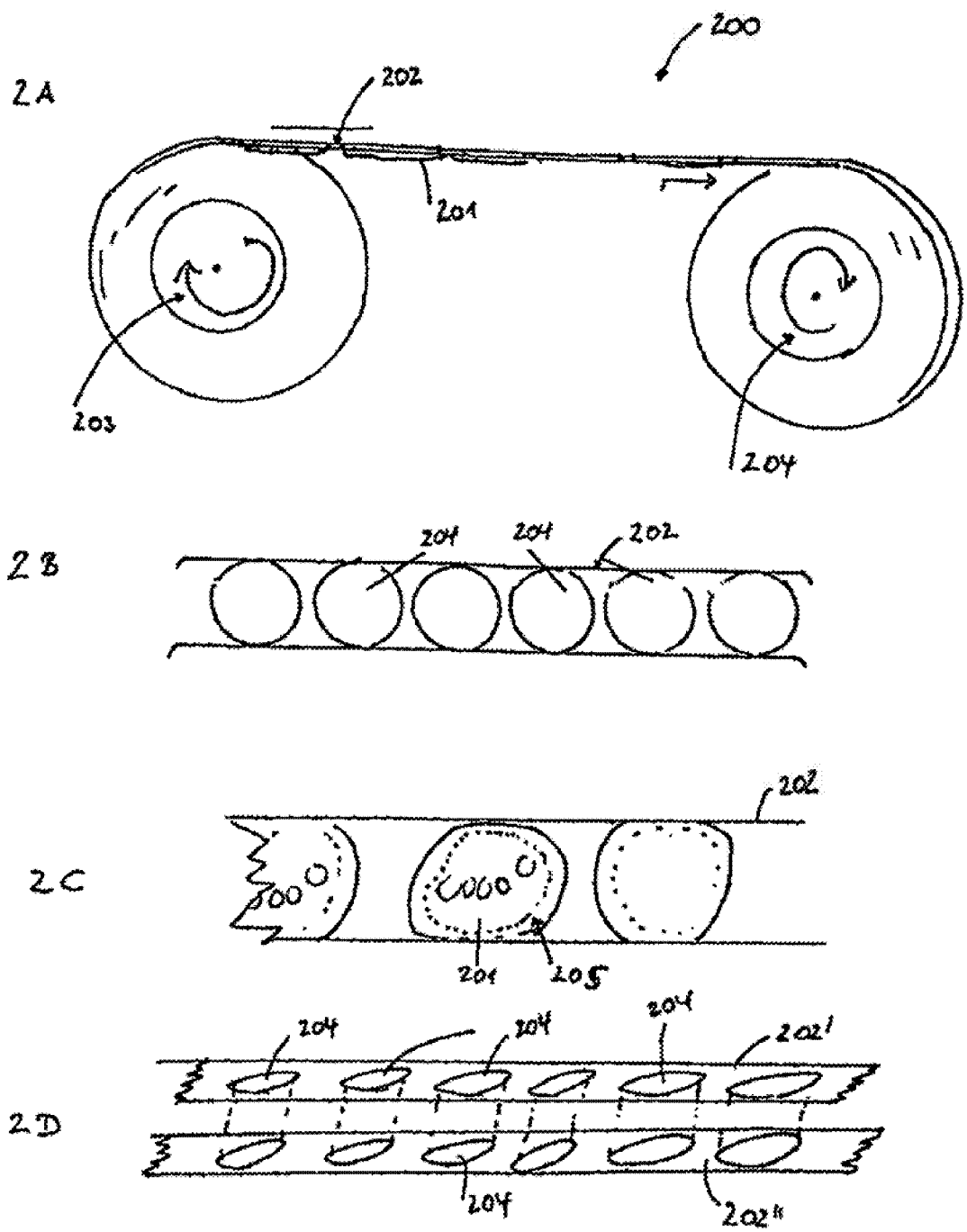
FIG. 2 shows transport means for transporting the product to be tested to the device according to the invention.

FIG. 2A is a representation of transport means 200 for transporting the object 201, for example a glove as shown schematically in FIG. 2C, to be tested to the device according to the invention not shown in FIG. 2. The object 201 is stored in or on a tape 202 which is rolled up on a first spool 203. After testing and eventual release of the object, the empty tape is rolled up on a second spool 204. The arrows indicate the moving directions of the spools 203 and 204 and the tape 202.

The tape 202 as represented in FIG. 2B consists in an especially preferred embodiment of two layers 202' and 202" as represented in FIG. 2D. In another embodiment not shown in FIG. 2, the tape comprises only one tape. Each layer 202' and 202" has preferably equidistant holes 204 sufficiently large to insert the specific object to which the product has to be applied. No specific form of the holes 204 is preferred, albeit circles, triangles, quadratic and rectangular forms are most often used. The product is held by its edge (cuff) 205 between the layers 202' and 202" as exemplified in FIGS. 2C and 2D. The tape 202 consists preferably of polymer materials, paper etc. It is understood that the material of the layers 202' and 202" may be the same or different.

Figure 3:
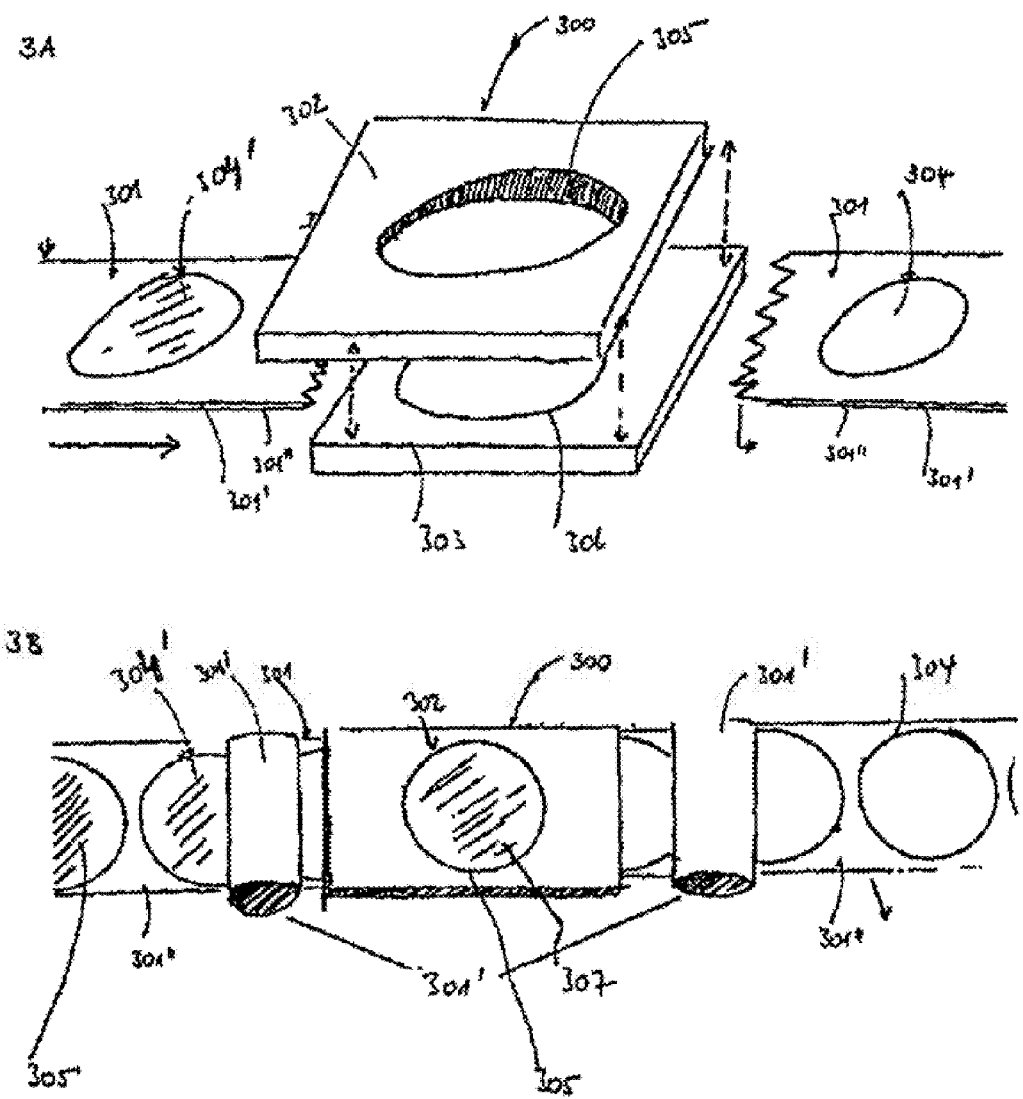
FIG. 3 shows a holder for the product to be tested at the outside of the device according to the invention.

FIG. 3 shows a holder 300 for use in the device according to the invention. FIG. 3A is a perspective view of holder 300 and figure 3B represents a top-down view of holder 300, each with a tape 301 as described in figure 2. As explained for FIG. 2, the tape 301 consists essentially of two layers 301' and 301" made of a material as explained before. An important factor for the success of a tape 301 consisting essentially of two layers 301' and 301" is the adhesive force which keeps the two layers together. It is important, that layer 301' can be peeled off from layer 301" without destruction. For this purpose, the presence of an adhesive layer between layer 301' and 301" is especially preferred. As mentioned in FIG. 2, equidistant holes 304 are located in both layers 301' and 301". The material (product) to be tested 304' is also located inside the holes. The holder 300 consists essentially of an upper portion 302 and a lower portion 303, both having a hole 305 and 306 which diameter is usually smaller than the diameter of the holes 304, so that the product to be tested is firmly held between upper portion 302 and lower portion 303 of the holder 300.

The tape 301 with the product 304' be tested is moved between the upper and lower portion 302, 303 of the holder 300 in the direction as indicated by the arrows. The product 304' to be tested is fixed between the upper and lower portion 302, 303 of the holder 300 and is now a "product-in-test" 307 upon application of a vacuum in the device according to the invention not shown in FIG. 3.

Figure 4:
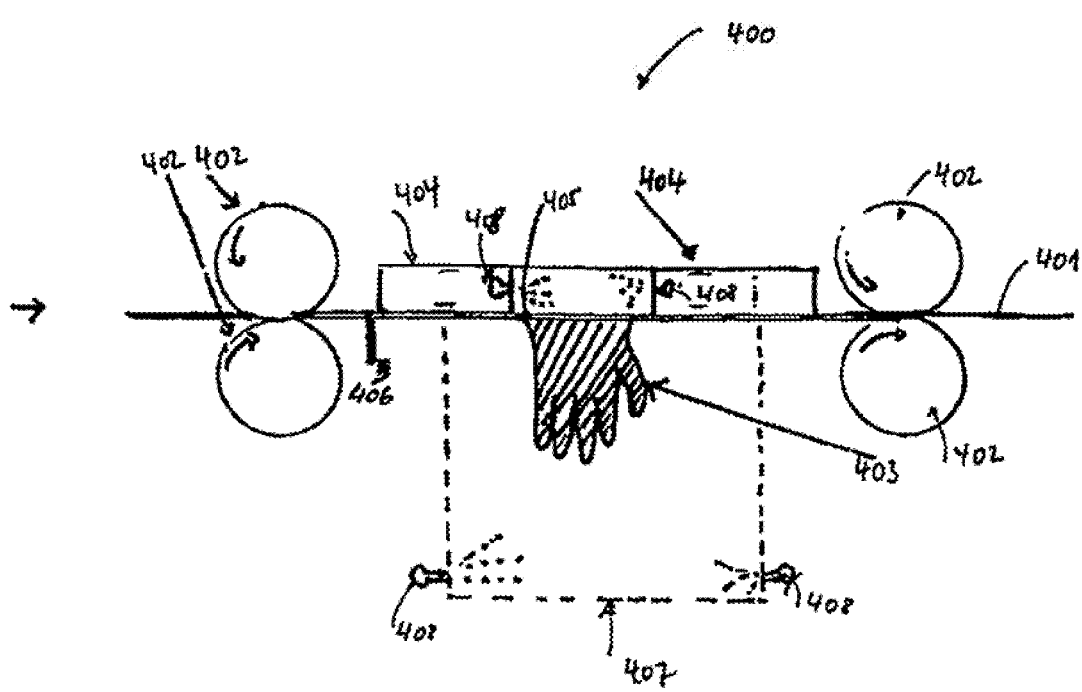
FIG. 4 shows a sectional view of a further embodiment of a device according to the invention.

FIG. 4 shows a sectional view through a portion of the device 400 of the invention. Accordingly a tape 401 consisting of two layers not represented in figure 4 is moved from spools not shown in FIG. 4 by rolls 402 in the direction of the arrows. The tape 401 contains latex gloves as the product to be tested. A latex glove 403 is adjusted by the holder 404 inside the hole 405 of the holder 404. In this embodiment, the holder 404 has no lower portion as described in figure 3. The function of the lower portion according to FIG. 3 is fulfilled by the housing of the device 400 according to the invention. The correct adjustment of the glove 403 over the hole 405 of the holder 404 is achieved by one or more positioning sensors 406. The positioning sensors are those essentially known by an artisan like ultrasound, piezoelectric, infrared, optical, laser sensors and the like. Further, one or more means 408 for spraying a sterilizing liquid, like valves, syringes etc. are located adjacent to the glove 403. Upon applying a vacuum inside the chamber 407, the glove 403 will swell and if the vacuum does not decrease will be sterilized by spraying means 408. An end user can therefore insert his hands in the glove(s) 403 and retire it while the glove will be released from the holder 404. The tape 401 is then transported further so that the next glove(s) can be tested. Transport and moving directions in all figures are indicated by arrows. The empty or partially filled tape (with defect gloves) is rolled on a second spool and thrown away. The device according to the invention thus enables a quick and hygienic testing and processing of materials of all kind especially in hygienically critical environments like in hospitals, abattoirs, in the food and health industry, brothels and the like.

The invention claimed is:

1. Device for the testing of packaging material, comprising a housing with an opening, a holder for receiving the packaging material, whereby the holder is positioned adjacent to an inner chamber with an in- and outlet and means configured for applying a vacuum in the inner chamber, and a monitor configured to detect a change in vacuum pressure due to a defect in a material being tested, wherein the device further comprises a stock section where the packaging material is contained before testing.

2. Device according to claim 1, further comprising a computer unit.

3. Device according to claim 1, characterized in that the means for applying a vacuum is a vacuum pump.

4. Device according to claim 3, further comprising a computer unit.

5. Device according to claim 3, characterized in that the material to be tested consists essentially of a foil.

6. Device according to claim 5, characterized in that the material is gloves, condoms, and packaging foils.

7. Device according to claim 5, characterized in that the foil comprises multiple layers.

8. Device according to claim 7, characterized in that the material is gloves, condoms, and packaging foils.

9. Device according to claim 3, further comprising means for transporting the material to be tested to the holder.

10. Device according to claim 9, further comprising indication means.

11. Device according to claim 10, characterized in that the indication means are selected from the group consisting of a display, a light emitting means and loud-speakers.

12. Device according to claim 1, further comprising means for transporting the material to be tested to the holder.

13. Device according to claim 12, further comprising indication means.

14. Device according to claim 13, characterized in that the indication means are selected from the group consisting of a display, a light emitting means and loud-speakers.

15. Device according to claim 1, characterized in that the material to be tested consists essentially of a foil.

16. Device according to claim 15, characterized in that the foil comprises multiple layers.

17. Device according to claim 15, characterized in that the material is gloves, condoms, and packaging foils.

\* \* \* \* \*